(12) United States Patent
Lin et al.

(10) Patent No.: US 7,529,646 B2
(45) Date of Patent: May 5, 2009

(54) INTELLIGENT VIDEO FOR BUILDING MANAGEMENT AND AUTOMATION

(75) Inventors: Yun-Ting Lin, White Plains, NY (US);
Tomas Brodsky, Croton on Hudson, NY (US); Mi-Suen Lee, New York, NY (US); Carolyn Ramsey, Pleasantville, NY (US)

(73) Assignee: Honeywell International Inc., Morristown, NJ (US)

( * ) Notice: Subject to any disclaimer, the term of this patent is extended or adjusted under 35 U.S.C. 154(b) by 483 days.

(21) Appl. No.: 11/397,781

(22) Filed: Apr. 4, 2006

(65) Prior Publication Data

US 2007/0024708 A1      Feb. 1, 2007

Related U.S. Application Data

(60) Provisional application No. 60/668,448, filed on Apr. 5, 2005.

(51) Int. Cl.
| | |
|---|---|
| G06F 11/00 | (2006.01) |
| G05B 23/02 | (2006.01) |
| G08B 23/00 | (2006.01) |
| G09G 5/00 | (2006.01) |
| G05B 11/01 | (2006.01) |
| G05B 15/00 | (2006.01) |
| G05B 21/00 | (2006.01) |

(52) U.S. Cl. .................... 702/188; 348/142; 348/143; 340/3.1; 340/517; 345/2.1; 700/17; 700/19; 700/83; 700/276

(58) Field of Classification Search .................. 700/17, 700/19, 83, 275, 276; 702/188; 705/1, 15, 705/28; 709/217, 223, 224; 715/700, 733, 715/740, 741; 340/3.1, 3.5, 3.9, 517, 521; 345/1.1, 2.1, 156; 348/113, 116, 135, 142, 348/143, 207.99, 211.11, 211.99; 379/102.01, 379/102.02; 725/78, 105
See application file for complete search history.

(56) References Cited

U.S. PATENT DOCUMENTS 6,240,326 B1 *   5/2001   Gloudeman et al. ........... 700/83

(Continued)

FOREIGN PATENT DOCUMENTS

JP           06338957 A  *  12/1994

(Continued)

*Primary Examiner*—Crystal J Barnes Bullock
(74) *Attorney, Agent, or Firm*—Husch Blackwell Sanders Welsh & Katz

(57) ABSTRACT

A video processing and analysis system is coupled to a building management and control system. The video processing system provides traffic, occupancy, and other information derived from video images of sections of the building and its environs to the building management and control systems. The building systems use this information in a variety of business management applications, including maintenance scheduling, asset replacement, elevator dispatching, HVAC and lighting control, and so on, to reduce operational or maintenance costs, expedite emergency procedures, improve service levels of building facilities, and regulate the building's environmental conditions.

51 Claims, 2 Drawing Sheets

U.S. PATENT DOCUMENTS

| | | | |
|---|---|---|---|
| 6,364,066 B1 * | 4/2002 | Bolch et al. | 187/391 |
| 7,027,808 B2 * | 4/2006 | Wesby | 455/419 |
| 7,119,674 B2 * | 10/2006 | Sefton | 340/521 |
| 7,284,639 B2 * | 10/2007 | Sasaki et al. | 187/395 |
| 7,301,456 B2 * | 11/2007 | Han | 340/541 |
| 7,380,279 B2 * | 5/2008 | Prokupets et al. | 726/27 |
| 2002/0147681 A1 | 10/2002 | Taminaka et al. | |
| 2005/0038571 A1 * | 2/2005 | Brickfield et al. | 700/295 |
| 2005/0090915 A1 | 4/2005 | Geiwitz | |
| 2005/0154494 A1 | 7/2005 | Ahmed | |
| 2005/0242201 A1 | 11/2005 | Shorrock | |
| 2006/0055664 A1 * | 3/2006 | Repetto et al. | 345/156 |
| 2006/0156361 A1 * | 7/2006 | Wang et al. | 725/105 |
| 2007/0151808 A1 * | 7/2007 | Amano | 187/391 |
| 2007/0256105 A1 * | 11/2007 | Tabe | 725/78 |
| 2008/0212099 A1 * | 9/2008 | Chen | 356/408 |

FOREIGN PATENT DOCUMENTS

| | | | |
|---|---|---|---|
| JP | 07160855 A | * | 6/1995 |
| JP | 10021491 A | * | 1/1998 |
| JP | 2001025073 A | * | 1/2001 |
| JP | 2002133559 A | * | 5/2002 |
| JP | 2003221174 A | * | 8/2003 |
| JP | 2003272066 A | * | 9/2003 |
| JP | 2004252763 A | * | 9/2004 |
| JP | 2005242471 A | * | 9/2005 |

* cited by examiner

INTELLIGENT VIDEO FOR BUILDING MANAGEMENT AND AUTOMATION

This application claims the benefit of U.S. Provisional Patent Application 60/668,448, filed 5 Apr. 2005.

BACKGROUND AND SUMMARY OF THE INVENTION

This invention relates to the field of video monitoring systems, and in particular to a video monitoring and processing system that is coupled to one or more building management systems to facilitate automated control and reporting.

The decreasing cost of video camera equipment, coupled with the increased desire for video security monitors, has resulted in the ubiquitous presence of video monitoring devices in buildings, parking lots, parks, and so on. Traditionally, these video devices are coupled to security systems that include varying amounts of video processing capabilities to automate the detection of events that trigger alarms or security notifications, and/or access control systems that limit access to recognized individuals.

It is an object of this invention to expand the use of video monitoring devices beyond security and access control systems. It is an object of this invention to apply video processing techniques to facilitate the management of buildings. It is a further object of this invention to apply video processing techniques to automate a number of processes associated with building management. For the purposes of this disclosure, building management is distinguished from building security and access control, and includes for example, systems for reducing operational or maintenance costs and procedures, improving emergency procedures, improving service levels of building facilities, regulating the building's environmental conditions, and so on.

These objects, and others, are achieved by coupling video processing and analysis systems to building management and control systems. A video processing system provides traffic, occupancy, and other information derived from video images of sections of the building and its environs to the building management and control systems. The building systems use this information in a variety of business management applications, including maintenance scheduling, asset replacement, elevator dispatching, HVAC and lighting control, and so on.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

The disclosure addresses systems that facilitate efficient operation and maintenance of buildings. For the purposes of this disclosure, the term building is generally defined to include any structure that is configured to provide some form of shelter from the environment, regardless of its particular form or location, and includes, for example, floating buildings, such as ships.

Figure 1:
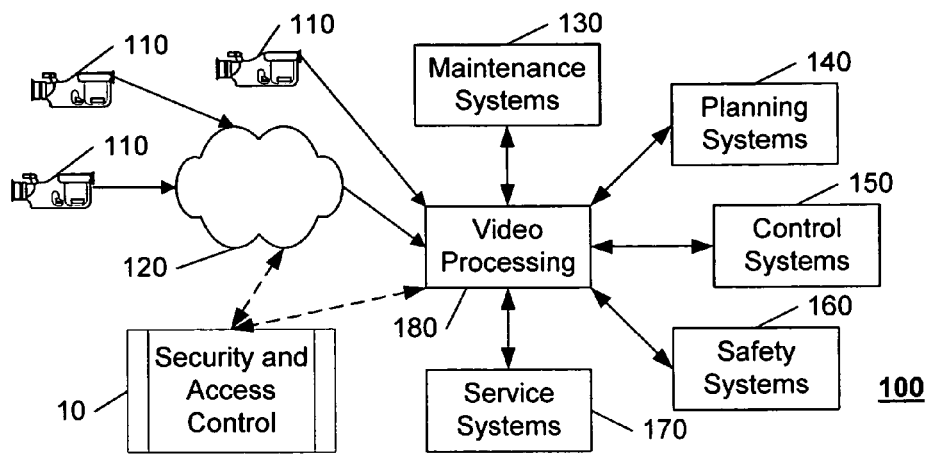
FIG. 1 illustrates an example building management system that incorporates video analysis in a variety of subsystem applications in accordance with this invention.

FIG. 1 illustrates an example building management system 100 that incorporates video analysis in a variety of subsystem applications 130-170 via a video processing system 180. The system 100 may also include one or more video sources 110, or it may utilize existing sources 110 that are included in a video-based security and/or access-control system 10, or a combination of both. These sources 110 may optionally be coupled to the video processing system 180 via a network 120. Although the processing system 180 is illustrated as a single component, one of ordinary skill in the art will recognize that the system 180 may be distributed among a variety of components, including both general and special purpose computers and digital signal processors, each of which may operate independently or cooperatively with the others, and may share resources with other systems, such as a security and/or access-control system 10. In like manner, although the sources 110 are illustrated using video-camera icons, one of ordinary skill in the art will recognize are not limited to optical sensors in the visible spectrum, and may include sensors that detect waves beyond the visible spectrum to provide imagery of the environment, including but not limited to near-field infrared, far-field infrared, thermal infrared, X-ray, and other imagery methods.

In a preferred embodiment, the video processing system 180 is an intelligent video system that comprises one or more computation servers and a set of video analysis software programs. The intelligent video system analyzes the views from cameras 110 and outputs relevant data and composite information in real-time. The term 'information' is used hereinafter to include data that may range from 'raw' data to 'processed' data, as well as results and determinations reached, and may include text, image, video, signaling, and other information forms or formats. As will be detailed further below, the subsystems 130-170 are configured to control resources based on the information derived from the images, generally in the form of a measure of the number of people or other objects at particular locations within the building, or within an area in proximity to the building. The measure may be communicated in a variety of forms, including, for example, an absolute count (e.g. "ten people at location 7"), a directional flow rate (e.g. "three people per minute entering portico A"), a relative count or flow rate (e.g. "many people entering portico B; few people leaving"), a threshold indicator (e.g. "elevator Y is full"), and so on. Other image-based information may also or alternatively be provided, including, for example, the state of an object (e.g. "door 7 is closed"), the state of the environment (e.g. "visibility is poor"), the identification of an event (e.g. "a taxi has arrived"), and so on. The location information or object identification will generally be correlated to a floor plan model used by the subsystems 130-170, and may include absolute coordinates, relative coordinates, or other identifiers (e.g. "door 7", "portico B") that are mapped to the floor plan.

The information from the processing system 180 is communicated to the building management subsystems 130-170 via any of various types of interface, such as network interface, USB, serial cable, and so on. The processing system 180 may interface directly with each of the subsystems 130-170, or it may broadcast its information commonly to all of the subsystems 130-170. Optionally, the building management system may include an integration module (not illustrated) that links the video-based information with information from other sensors or modules in the building management system, and this integration module may communicate with each of the subsystems directly or communally.

Each subsystem 130-170 includes an interface that is configured to receive and process the information provided by the processing system 180 as required, and as discussed further below with regard to the example subsystem operations. The illustrated systems 130-170 are provided as example building-related subsystems that could benefit by the integration of video-based information into these systems, although one of ordinary skill in the art will recognize that the principles of this invention are not limited to the particular example systems or applications.

Figure 2:
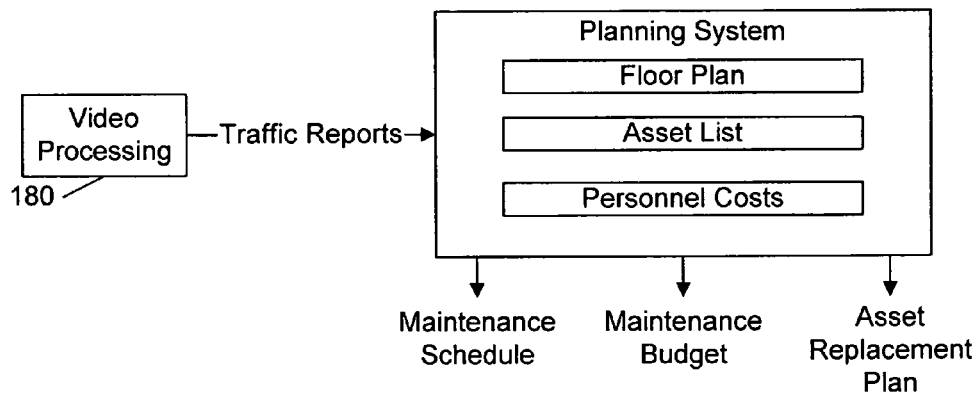
FIGS. 2-6 illustrate example subsystem applications that incorporate video analysis in a variety of subsystem applications in accordance with this invention, including a maintenance planning system, an elevator control system, an emergency evacuation system, a facilities availability notification system, and HVAC control systems.

FIG. 2 illustrates an example building maintenance planning system that uses video-based information to better manage maintenance, repair, and asset replacement operations.

USPA 2002/0147681, "METHOD AND APPARATUS FOR BUILDING MANAGEMENT, AND PROGRAM PRODUCT", filed 23 Aug. 2001 for Taninaka et al., published 10 Oct. 2002, and incorporated by reference herein, teaches a management system that provides maintenance and repair schedules based on the anticipated useful life of the building assets and facilities and an ongoing assessment of the deterioration of each repairable or replaceable asset. FIG. 2 illustrates how such a system, or any similar maintenance and repair planning system, can be enhanced by the addition of video-based information.

In FIG. 2, the video processing system 180 collects image data from a variety of cameras that view different areas within the building. Based on these images, the video processing system can provide information regarding the traffic flow through each area, the utilization of resources in the area, and so on. If one area exhibits significantly more traffic and/or occupancy than another, it can be expected that the assets in that area, such as the carpeting, furniture, and so on, will exhibit a higher deterioration rate than the assets in the other area. Similarly, the higher traffic/occupancy areas may require more frequent cleaning and other maintenance tasks. In like manner, a count of the number of people using a restroom can be used to determine how often to replenish the towel and tissue dispensers, and a measure of the time that lights are turned on can be used to determine how often they should be scheduled to be replaced. Similarly, a detected failure of a light can be used to schedule an immediate replacement; and, an analysis of the appearance of surfaces of furniture can be used to assess wear patterns and rates of deterioration. As illustrated in FIG. 2, an intelligent video system coupled with a maintenance planning system facilitates the generation of maintenance schedules and budgets, as well as plans for replacing and replenishing assets and consumable supplies, based on observed usage patterns.

Figure 3:
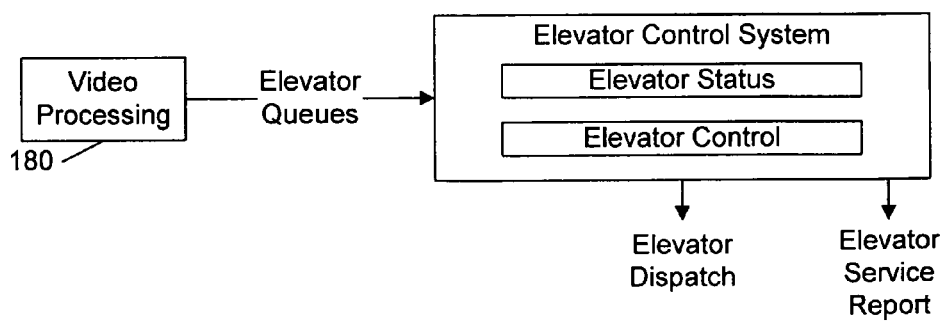

FIG. 3 illustrates the use of video-based information to better manage a bank of elevators. Conventional elevator systems use button sensors at each floor to determine when and where to dispatch an elevator car. A prevalent problem with conventional elevators is that there is no way to signal the number of people waiting for the elevator at each floor. For example, repeated activations of the call button have no effect, or if such activations were used, it would be impossible to determine whether the repeated activations were caused by one person or many people.

In the example elevator control system, one or more cameras are placed outside of the elevator doors at each floor, or at select high-traffic floors. The images from the cameras are analyzed by the video processing system to detect how many people are waiting for elevators. The number of waiting people at each floor is provided to the elevator control logic, and, based on the current location of each elevator car, and its capacity, the elevator cars are dispatched to minimize one or more service criteria. For example, the waiting time for the majority of people waiting for the elevator to arrive may be minimized, while imposing other constraints, such as assuring that no person waits longer than some maximum waiting time. If the number of people waiting for an elevator exceeds the capacity of a single elevator car, multiple elevator cars are sent to the right floor, provided that there are sufficient elevators available for dispatch. Similarly, a classification of the 'type' of passenger in each queue may be used to optimize the dispatch of elevator cars. For example, if a wheelchair-bound person is waiting for an elevator, a nearly-full elevator would not be dispatched to stop at that floor.

In addition to providing a demand-based dispatch of elevator cars, the data collected regarding the number of people waiting and the amount of wait time for each can be used to provide service reports that can be used for planning potential upgrades, developing improved dispatch algorithms, or modifying organizational behavior, such as implementing staggered schedules, and so on.

The video processing system 180 may also be configured to detect any person approaching the elevator so that the elevator control system can automatically send an available elevator to this floor to reduce the waiting time. Such an option is particularly well suited for use in a hotel, where people often carry multiple pieces of luggage and pressing the call button is inconvenient; or in a hospital, where people are often partially disabled, or in wheelchairs. Such automated feature will serve to provide a market-distinction among competing service establishments, by providing demonstrable efficient service and convenience to their customers/clients.

Figure 4:
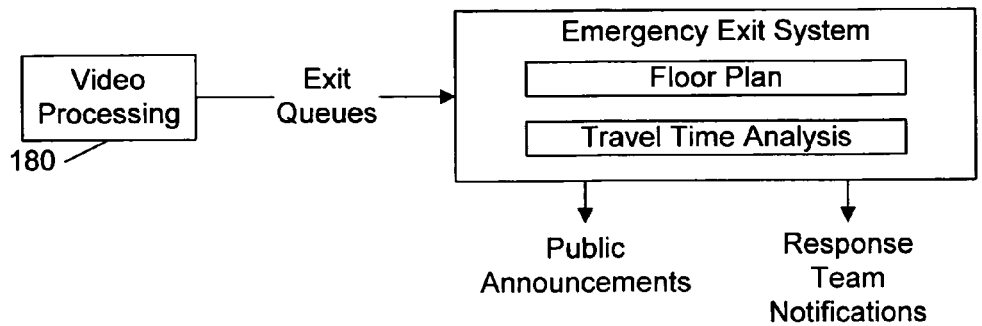

FIG. 4 illustrates the use of video-based information to facilitate efficient emergency response procedures. For a large building with a large number of occupants, in case of an emergency (such as fire, terrorist attacks, blackout, and so on), it is critical to evacuate the occupants as quickly as possible. With video cameras placed at all the exits doors or staircases, an intelligent video system can detect the current crowdedness level and traffic amount at each exit. Linked with the building floor map information, the building management system can use the queue length at each egress to determine alternatives to minimize the evacuation time. Similarly, with video cameras placed throughout the building, dynamic exit plans can be created based on the current occupancy, so that the best exit for people at various parts of the building can be determined, and directions provided to effect the fastest evacuation from the building. Such emergency route information may be shown on display devices at various areas in the building, or can be announced by public announcement system. Additionally, the count and location of people throughout the building can be provided on a continuing basis to the responding fire, police, or rescue teams.

Figure 5:
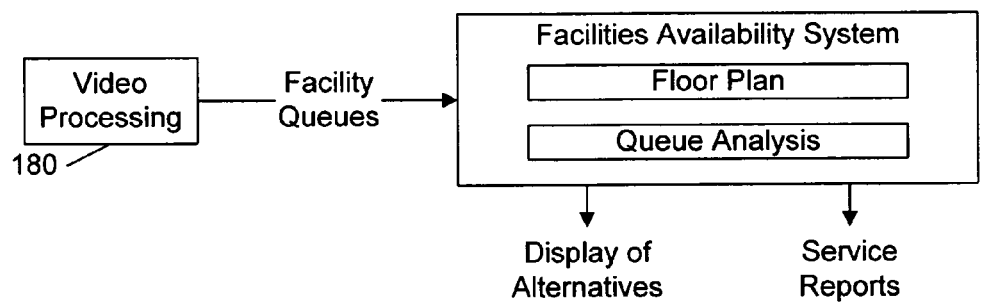

FIG. 5 illustrates the use of video-based information for optimizing the availability of facilities for use by the occupants. In the previously discussed elevator control system, for example, in environments having multiple elevator banks, such as cruise ships, the elevator control system can be configured to notify large groups of people waiting at one elevator bank that another elevator bank has available capacity. In other environments, such as airports, shopping malls, or other public places, intelligent video systems can be used to detect the length of the waiting lines at some facilities such as Internet access terminals, rest rooms, ATMs, restaurants, and so on. In an office environment, intelligent video systems may also be used to identify available meeting rooms. In an environment serviced by several parking lots, alternative parking areas can be identified, based on available spaces. By linking with the building management system, when a queue exists at one location, a display panel at that location can provide the location of the nearest similar facility with a shorter queue. As used herein, the term queue refers to one or more people or objects using or desiring to use a given facility, regardless of their physical arrangement.

Figure 6:
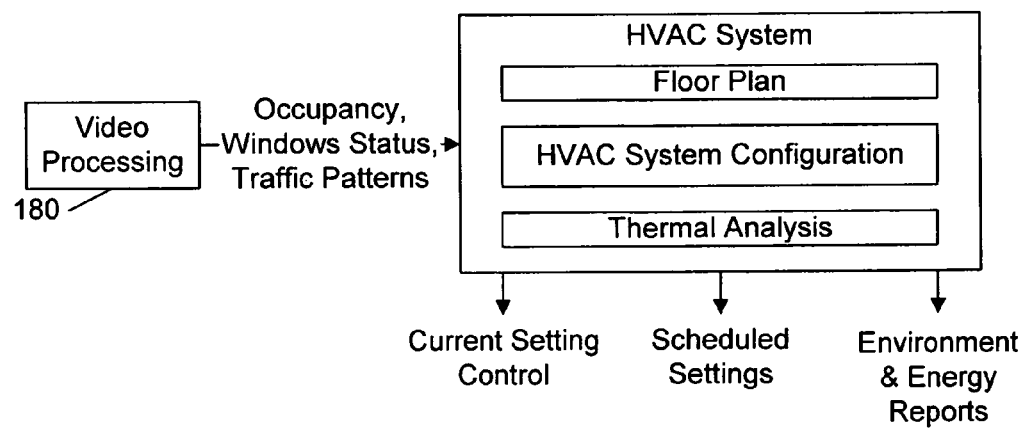

FIG. 6 illustrates the use of video-based information for optimizing the performance of a heating, ventilation, and air conditioning (HVAC) system.

USPA 2005/0242201, "INTELLIGENT ENVIRONMENTAL ROOM AIR ASSIST SYSTEM AND METHOD", filed 30 Apr. 2004 for John E. Shorrock, published 3 Nov. 2005, and incorporated by reference herein, teaches the control of an HVAC system based on sensors that sample the environment. When many people are in a room, heat and $CO_2$ levels rise, and Shorrock's system adjusts the ventilation to restore the room to a more comfortable level. By providing a video-based system that detects people entering the room, the ventilation can be adjusted in anticipation of the additional generation of heat and $CO_2$, so that a rise in these levels does not occur. USPA 2005/0154494, "INTEGRATED BUILDING ENVIRONMENT DATA SYSTEM", filed 29 Sep. 2004 for Osman Ahmed, published 14 Jul. 2005, also teaches controlling an HVAC and other systems based on environmental sensors, and is also incorporated by reference herein.

USPA 2005/0090915, "PROGRAMMABLE AND EXPANDABLE BUILDING AUTOMATION AND CONTROL SYSTEM", filed 22 Apr. 2004 for John Geiwitz, published 28 Apr. 2005, and incorporated by reference herein, teaches the use of environmental monitors, as well as monitors that detect open windows and doors. By positioning cameras with views that include many windows and/or doors, the video image data can be analyzed to determine which windows or doors are opened, thereby avoiding the need to install sensors and the need to receive a status indication from each of these individual sensors.

Video-based data may also be used in other novel applications related to building management and HVAC control. In many office buildings, for example, heating and cooling systems run on a fixed schedule that is tied to the hours of operation. Holidays and other exceptions to the regular schedule must be carefully entered into the system. There are also unscheduled exceptions: the opening of the building may be delayed due to inclement weather; the building may close down early before a holiday weekend; the building may not open due to a state of emergency. In these cases, the HVAC systems may be running needlessly, wasting energy. By determining actual-occupancy, based on images of people entering and leaving a building, or images of common areas within the building, instead of scheduled-occupancy, the HVAC system can provide optimized performance.

In addition to monitoring or counting people, occupancy information can be derived from other images as well. For example, an intelligent video system monitors the parking lots or parking garages associated with the building. If the parking area remains empty or sparsely populated after the usual arrival times, this information can be used to deduce that this may be an unscheduled late opening or closing of the building. In the evening, if the parking lot empties early, or if there is high exit traffic earlier than usual, the video information provides an indication that the building will close early. Similarly, if an unusually higher number of vehicles each case, the HVAC system can be automatically adjusted according to the situation deduced from the video-based information.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A system comprising:
a video processing system that is configured to receive images from one or more video sources, and to produce therefrom video-based information, the video-based information further comprising a measure of traffic of objects including at least a count of objects, a count of objects per unit time, and a directional flow pattern; and
a building management system that is configured to control operation of one or more resources of a building based on the video-based information.

2. The system of claim 1, including
a plurality of video sources that are configured to provide the images to the video processing system.

3. The system of claim 2, wherein
the video sources provide the images in at least one of: an infrared range and an X-ray range.

4. The system of claim 1, wherein
the building management system includes a model of a floor plan of the building, and
the video-based information is correlated to the floor plan.
5. The system of claim 1, wherein
the video-based information includes a state of at least one object in the images.
6. The system of claim 5, wherein
the at least one object includes at least one of: a door and a window.
7. The system of claim 1, wherein
the video processing system includes a digital signal processor.
8. The system of claim 1, wherein
the building management system includes a maintenance planning system.
9. The system of claim 8, wherein
the maintenance planning system is configured to control maintenance activities based on the measure of traffic.
10. The system of claim 8, wherein
the maintenance planning system is configured to control asset replacement activities based on the measure of traffic.
11. The system of claim 8, wherein
the maintenance planning system is configured to control replenishment of supplies based on the measure of traffic.
12. The system of claim 1, wherein
the building management system includes an elevator control system.
13. The system of claim 12, wherein
the count of objects relates to one or more queues of objects at one or more floors of the building, and
the elevator control system is configured to dispatch elevator ears based on the one or more queues of objects.
14. The system of claim 13, wherein
the measure of traffic includes a classification associated with the one or more queues of objects, and
the elevator control system is configured to dispatch elevator cars based on the classification.
15. The system of claim 13, including
one or more video sources located at the one or more floors that are configured to provide the images to the video processing system.
16. The system of claim 12, wherein
the elevator control system is configured to provide a notification of available alternatives based on the measure of traffic.
17. The system of claim 12, wherein
the directional flow pattern relates to objects approaching one or more elevators, and
the elevator control system is configured to dispatch elevator cars based on the directional flow pattern.
18. The system of claim 1, wherein
the building management system includes an evacuation system.
19. The system of claim 18, wherein
the measure of traffic relates to objects at one or more egress locations, and
the evacuation system is configured to provide notification of available alternatives based on the measure of traffic.
20. The system of claim 19, wherein
the evacuation system is further configured to provide status information to responding personnel.
21. The system of claim 18, wherein
the count of objects relates to object occupancy at one or more locations in the building, and
the evacuation system is configured to provide egress directions based on the object occupancy.
22. The system of claim 21, wherein
the evacuation system is further configured to provide status information to responding personnel.
23. The system of claim 1, wherein the building management system includes a facilities monitoring system.
24. The system of claim 23, wherein
the measure of traffic includes a queue measure associated with each of a plurality of facilities, and
the facilities monitoring system is configured to provide notification of available alternative facilities based on the queue measures.
25. The system of claim 24, wherein
the plurality of facilities includes at least one of:
a plurality of meeting rooms,
a plurality of parking areas,
a plurality of Internet access workstations,
a plurality of rest rooms,
a plurality of elevators,
a plurality of ATMs, and
a plurality of restaurants.
26. The system of claim 1, wherein
the building management system includes an HVAC control system.
27. The system of claim 26, wherein
the measure of traffic includes a count of objects occupying the building, and
the HVAC control system is configured to control environmental conditions of the building based on the count of objects.
28. The system of claim 27, wherein
the directional flow pattern is based on objects entering and leaving the building.
29. The system of claim 27, wherein
the count of the objects is based on a presence of vehicles in an area associated with the building.
30. The system of claim 27, wherein
the directional flow pattern is based on objects entering and leaving one or more locations in the building.
31. The system of claim 26, wherein
the measure of traffic includes a count of objects occupying one or more locations of the building, and
the HVAC control system is configured to control environmental conditions at the one or more locations based on the count of objects.
32. The system of claim 26, wherein
the HVAC control system is configured to operate in accordance with a selection of a scheduled setting from a plurality of scheduled settings, and
the HVAC control system is configured to select the scheduled setting based on the measure of traffic.
33. The system of claim 26, wherein
the measure of traffic includes a state of at least one window of the building.
34. A method comprising:
receiving images from one or more video sources,
processing the images to produce video-based information, the video-based information further comprising a measure of traffic of objects, the measure of traffic including at least a count of objects, a count of objects per unit time, and a directional flow pattern; and
controlling one or more resources of a building based on the video-based information.

35. The method of claim 34, wherein
the video-based information is correlated to a floor plan of the building.
36. The method of claim 34, wherein
the video-based information includes a state of at least one object in the images.
37. The method of claim 34, further comprising
controlling the one or more resources includes controlling maintenance activities based on the measure of traffic.
38. The method of claim 34, wherein
the count of objects relates to one or more queues of objects at one or more floors of the building, and
controlling the one or more resources includes controlling elevator cars based on the one or more queues of objects.
39. The method of claim 34, wherein
the measure of traffic relates to objects at one or more egress locations, and
controlling the one or more resources includes providing notification of available alternatives based on the measure of traffic.
40. The method of claim 34, wherein
the measure of traffic includes a queue measure associated with each of a plurality of facilities, and
controlling the one or more resources includes providing notification of available alternative facilities based on the queue measures.
41. The method of claim 34, wherein the
measure of traffic includes a count of objects occupying the building, the method further comprising:
controlling the one or more resources includes controlling environmental conditions of the building based on the count of objects.
42. The method of claim 34, wherein the measure of traffic includes a count of objects occupying one or more locations of the building, the method further comprising:
controlling the one or more resources includes controlling environmental conditions at the one or more locations based on the count of objects.
43. A computer program that, when executed on a processing system, causes the processing system to:
receive images from one or more video sources,
process the images to produce video-based information, the video-based information further comprising a measure of traffic of objects, the measure of traffic including at least a count of objects, a count of objects per unit time, and a directional flow pattern; and
control one or more resources of a building based on the video-based information.
44. The program of claim 43, wherein
the video-based information is correlated to a floor plan of the building.
45. The program of claim 43, wherein
the video-based information includes a state of at least one object in the images.
46. The program of claim 43, wherein the processing system
controls of the one or more resources includes control of maintenance activities based on the measure of traffic.
47. The program of claim 43, wherein
the count of objects relates to one or more queues of objects at one or more floors of the building, and
control of the one or more resources includes control of elevator cars based on the one or more queues of objects.
48. The program of claim 43, wherein
the measure of traffic relates to objects at one or more egress locations, and
control of the one or more resources includes providing notification of available alternatives based on the measure of traffic.
49. The program of claim 43, wherein
the measure of traffic includes queue measure associated with each of a plurality of facilities, and
control of the one or more resources includes providing notification of available alternative facilities based on the queue measures.
50. The program of claim 43, wherein
the measure of traffic includes a count of objects occupying the building, and
control of the one or more resources includes control of environmental conditions of the building based on the count of objects.
51. The program of claim 43, wherein
the measure of traffic includes a count of objects occupying one or more locations of the building, and
control of the one or more resources includes control of environmental conditions at the one or more locations based on the count of objects.

\* \* \* \* \*